(12) United States Patent
Lapoehn (10) Patent No.: US 11,872,428 B1
(45) Date of Patent: Jan. 16, 2024

(54) SOLID TEFLON SADDLE FOR SPRINKLER HEADS

(71) Applicant: Gerhard Lapoehn, Titusville, FL (US)

(72) Inventor: Gerhard Lapoehn, Titusville, FL (US)

( * ) Notice: Subject to any disclaimer, the term of this patent is extended or adjusted under 35 U.S.C. 154(b) by 0 days.

(21) Appl. No.: 17/983,027

(22) Filed: Nov. 8, 2022

(51) Int. Cl.
*A62C 37/14* (2006.01)
*B23P 11/00* (2006.01)
*B23P 15/00* (2006.01)

(52) U.S. Cl.
CPC .............. *A62C 37/14* (2013.01); *B23P 11/00* (2013.01); *B23P 15/001* (2013.01)

(58) Field of Classification Search
CPC ......... A62C 37/12; A62C 31/02; A62C 35/58; A62C 35/68; A62C 37/08; A62C 37/11; B05B 1/02; B05B 12/08
See application file for complete search history.

(56) References Cited

U.S. PATENT DOCUMENTS

| | | | |
|---|---|---|---|
| 3,627,205 A | 12/1971 | Healy | |
| 4,062,494 A | 12/1977 | Healy | |
| 6,336,509 B1 * | 1/2002 | Polan | A62C 37/11 169/37 |
| 8,607,886 B2 * | 12/2013 | Harrington | A62C 37/08 239/524 |
| 2008/0308285 A1 | 12/2008 | Su | |
| 2018/0361181 A1 * | 12/2018 | Huotari | A62C 99/0072 |

* cited by examiner

*Primary Examiner* — Minh N Trinh
(74) *Attorney, Agent, or Firm* — Brian S. Steinberger; Hilary F. Steinberger; Law Offices of Brian S. Steinberger, P.A.

(57) ABSTRACT

Devices, apparatus, systems, and methods for providing and retrofitting sprinkler heads. with a solid one-piece Teflon saddle and a stainless steel washer to replace a Beryllium washer with Teflon tape on both sides in sprinkler heads. The Teflon saddle can be formed from one piece of Teflon having a cylindrical base and an upper cylindrical section having a raised cylindrical rim, the upper cylindrical section having a wider diameter than the cylindrical base, and narrow depth central opening in the upper cylindrical section. The upper cylindrical section can have a bottom edge having an incline between approximately 10 degrees to approximately 20 degrees running from an outer perimeter to an inner end.

19 Claims, 13 Drawing Sheets

FIG. 1A

PRIOR ART

FIG. 1B

PRIOR ART

SOLID TEFLON SADDLE FOR SPRINKLER HEADS

FIELD OF INVENTION

This invention relates to sprinkler heads, and in particular to devices, apparatus, systems, and methods for providing and retrofitting sprinkler heads. With a solid Teflon saddle to replace a Beryllium washer with Teflon tape on both sides in sprinkler heads.

BACKGROUND AND PRIOR ART

Fire suspension systems that use sprinkler heads currently require a beryllium washer that is stamped, and further processed and taped on both sides with Teflon tape.

Figure 1A:
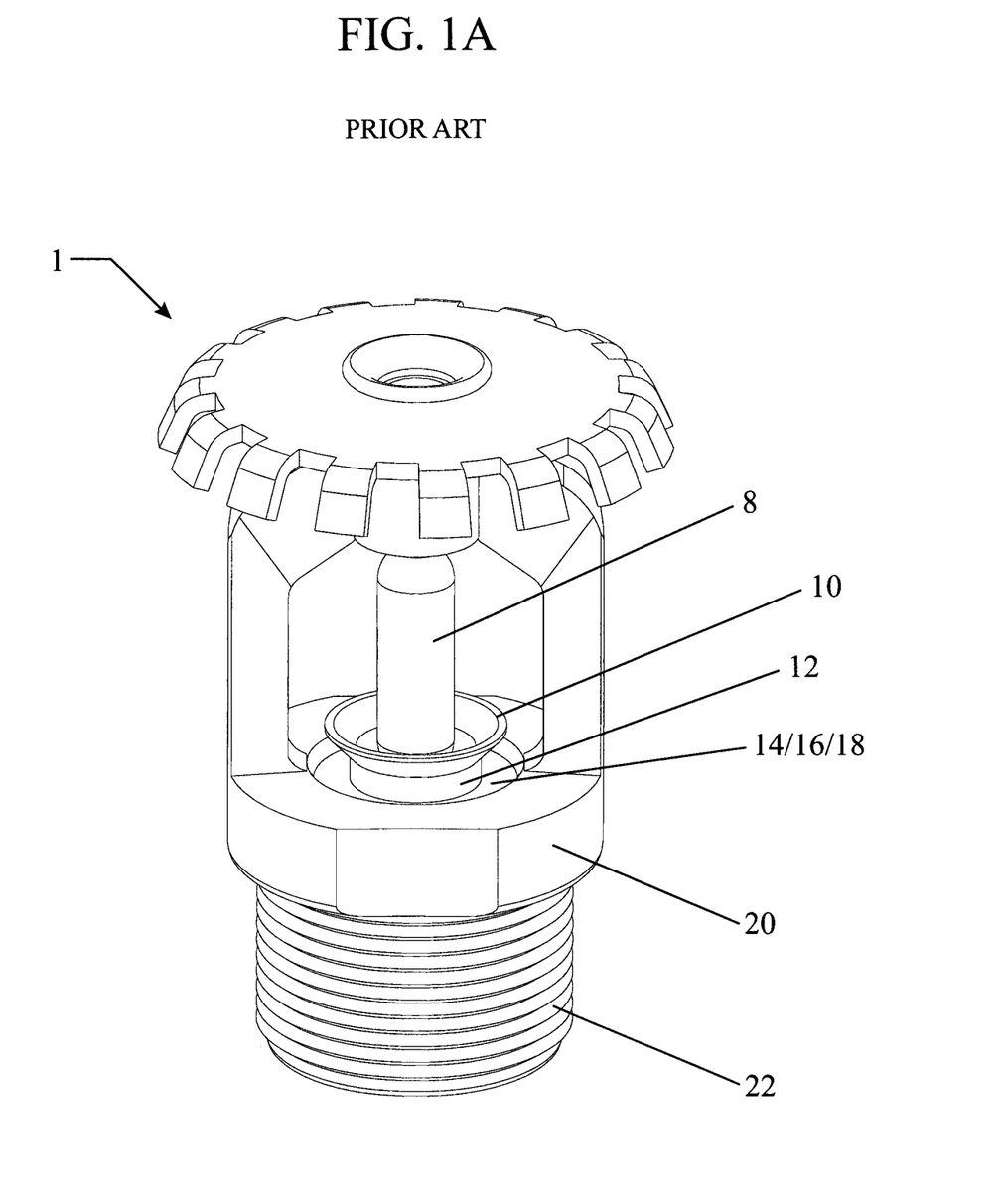
FIG. 1A is a perspective view of an assembled prior art sprinkler head.
Figure 1B:
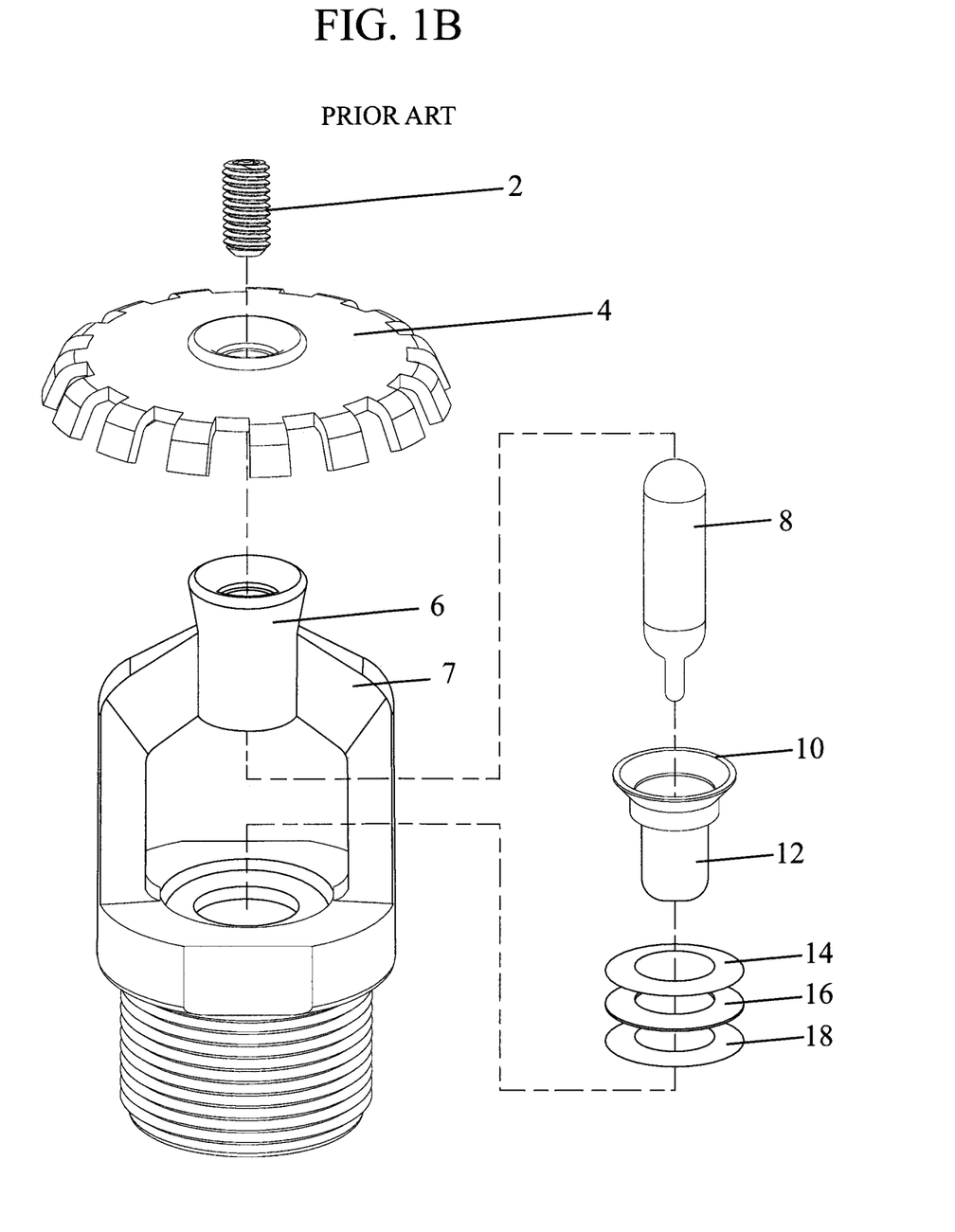
FIG. 1B is an exploded perspective view of the sprinkler head of FIG. 1A.

FIG. 1A is a perspective view of an assembled prior art sprinkler head using a beryllium washer taped on both sides with Teflon tape. FIG. 1B is an exploded perspective view of the prior art sprinkler head shown in FIG. 1A.

Referring to FIGS. 1A-1B, a prior art sprinkler head 1 includes an assemble screw 2, deflector 4, an internally threaded socket 6 in a frame 7 attached to a base 20 having a threaded end 22. The assemble screw 2 attaches the deflector 4 to threaded socket 6 in the frame 7. In the bottom of the threaded socket 6 can be a glass bulb 8 with a bottom tip end with passes into a funnel opening 10 on top of a copper saddle (pin cap) 12. A beryllium washer spring 16 has a top Teflon sheet 14 taped onto the top of the beryllium washer spring 16 and a bottom Teflon sheet 18 taped to the bottom of the. beryllium washer spring 16. The bottom stem end of the pin cap 12 passes through the double sided Teflon taped beryllium washer spring 16.

Typically, the temperature at which the bulb 8 breaks in a sprinkler head is between approximately 135 to approximately 165 degrees F., with many breaking at approximately 155 degrees F.

There are many problems with the prior art sprinkler head 1 shown in FIGS. 1A-1B that are assembled with beryllium washers 16.

The current assembly of the prior art sprinkler head 1 shown in FIGS. 1A-1B is difficult to assemble and leads to high failure rates, which are known to be leakers in the sprinkler head industry.

The current assembly of the sprinkler head 1 generally requires some four parts to be assembled.

A beryllium washer 16 is stamped then further processed and taped on both sides with Teflon tape 14, 18. A copper saddle 12 is needed. The copper saddle 12 must be stamped or machined. Then the beryllium washer 16 and copper saddle 12 are assembled.

The beryllium washers 16 are expensive to manufacture due to material costs and high processing costs related to assembly and manufacturing.

Beryllium washers 16 requires the purchase of beryllium which is a rare element, which can take up to one year to receive the material.

Beryllium is also known to cause health problems, such as Berylliosis which is an occupational lung disease for which there is no cure.

Beryllium is also known to oxidize.

Thus, the need exists for solutions to the above problems with the prior art.

SUMMARY OF THE INVENTION

A primary objective of the present invention is to provide devices, apparatus, systems, and methods for providing and retrofitting sprinkler heads with a solid single Teflon saddle and stainless steel washer to replace a Beryllium washer with Teflon tape on both sides in sprinkler heads A secondary objective of the present invention is to provide devices, apparatus, systems, and methods for providing and retrofitting sprinkler heads. With a solid single Teflon saddle and stainless steel washer which is less expensive than using Beryllium to provide a complete seal in a sprinkler head without water leaks.

A preferred embodiment of the present invention is to use a solid single molded part formed from Teflon in a sprinkler head. Teflon is a readily available material with no known health concerns, no environmental impact, and can be recycled. Teflon has a lifespan of at least 50 years. With Teflon there is no oxidation that can cause leaks with the current beryllium washer configuration.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A list of components will now be described.
1. prior art sprinkler head
2. assemble screw
4. deflector
6. threaded socket
7. frame
8. glass bulb
10. funnel opening to copper saddle
12. copper saddle (pin cap)
14. top Teflon sheet
16. beryllium washer-spring
18. bottom Teflon sheet
20. base with threaded stem.
100. Teflon saddle
110. lower cylindrical base
120. upper enlarged cylindrical section
122. raised rim on upper cylindrical section
124 base on upper cylindrical section
125. center opening for receiving bulb tip.
200. beveled stainless steel washer
210 upper raised surface
220 lower raised surface
230 center hole
300 Assembly with solid Teflon saddle and stainless steel washer The invention can use solid molded Polytetrafluoroethylene (PTFE) commonly referred to as Teflon, as a Teflon saddle. Teflon is low friction and is an ideal material to be utilized as a seal and/or gasket.

Teflon is a recyclable material with no impact to the environment.

The one-part Teflon saddle replaces a four part assembly 10/12 and 14, 16, and 18 shown in FIGS. 1A-1B. The Teflon saddle seals the surface of the sprinkler base housing eliminating defective sprinkler heads, and eliminates use of a beryllium washer.

With a Teflon saddle, the manufacturing process is simplified and provides a complete seal without water leaks.

Teflon material is substantially less expensive than beryllium.

Teflon is a stable material capable to withstand low and high temperatures.

Figure 2A:
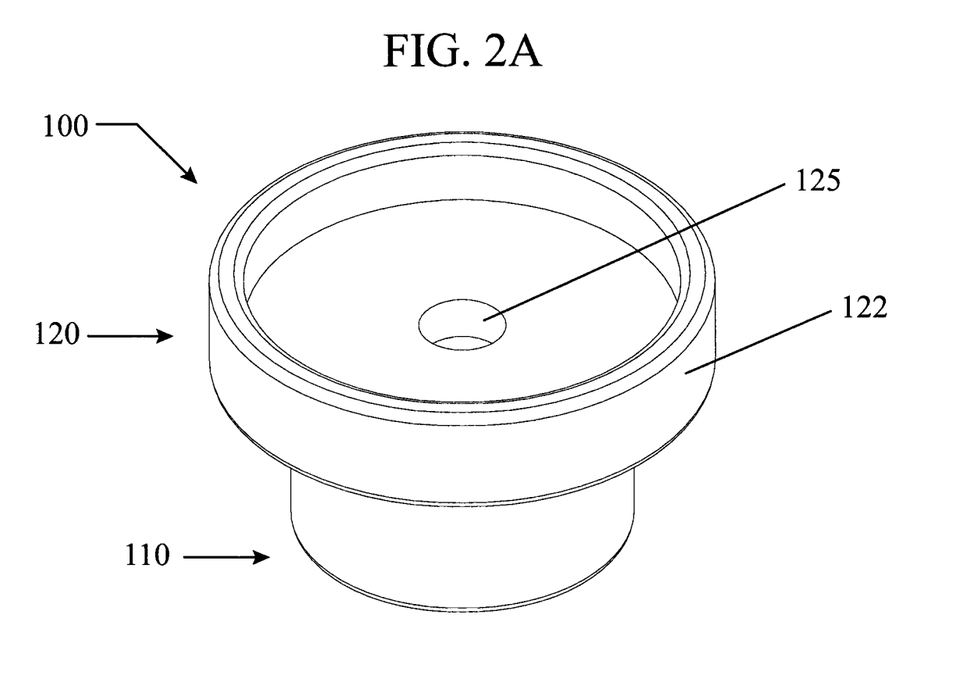
FIG. 2A is an upper side perspective view of the novel Teflon saddle.
Figure 2B:
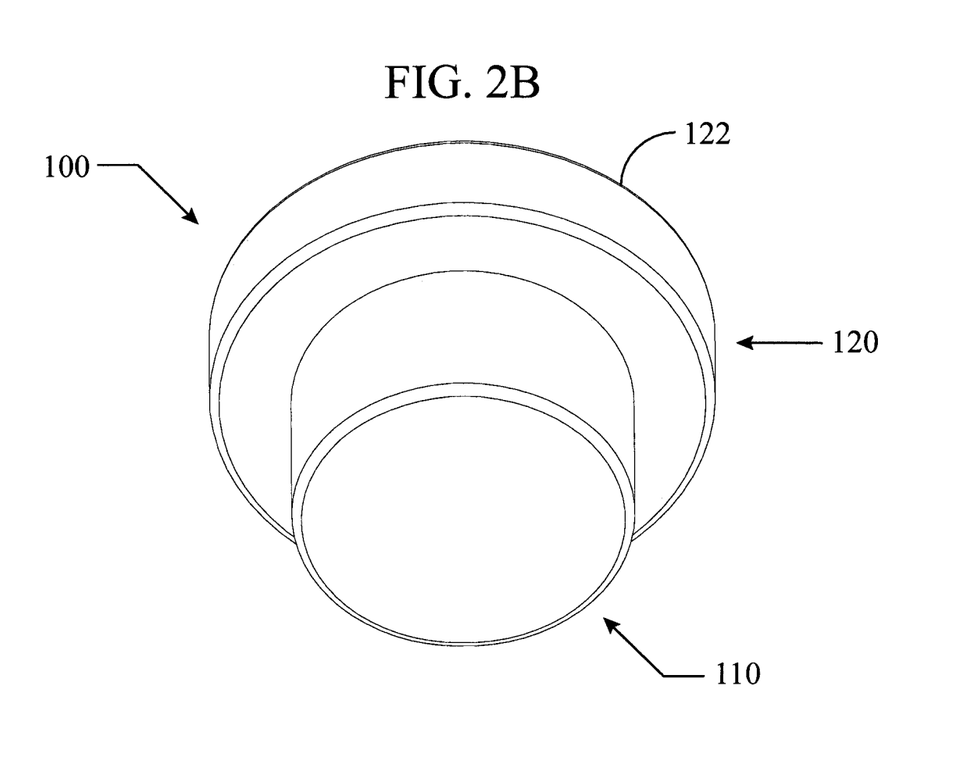
FIG. 2B is a lower side perspective view of the Teflon saddle of FIG. 2A.

FIG. 2A is an upper side perspective view of the novel Teflon saddle 100. FIG. 2B is a lower side perspective view of the Teflon saddle 100 of FIG. 2A.

Figure 3A:
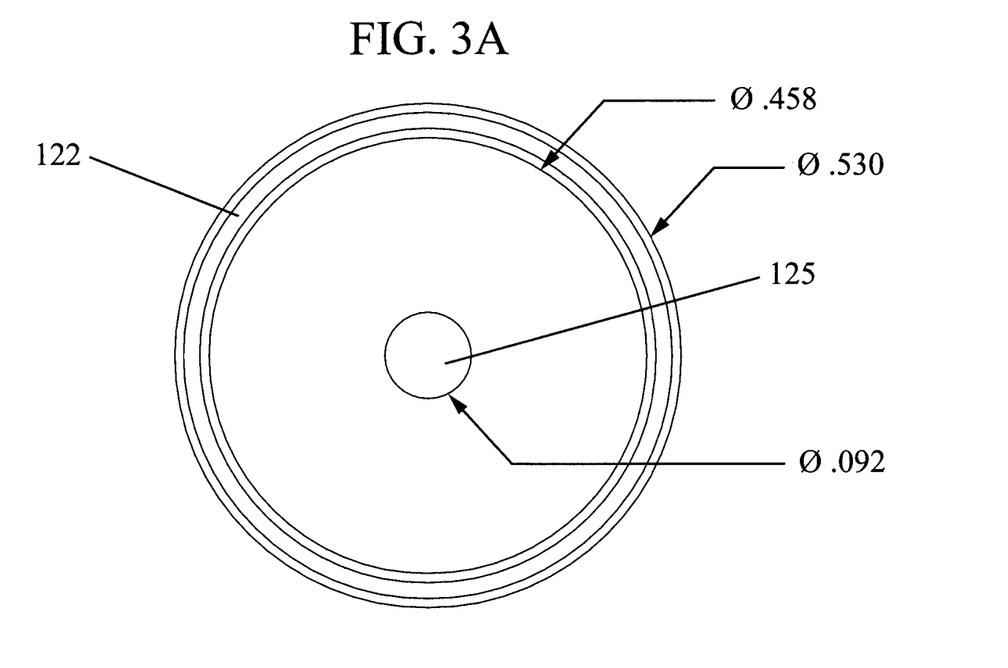
FIG. 3A is a top view of the Teflon saddle of FIG. 2A.
Figure 3B:
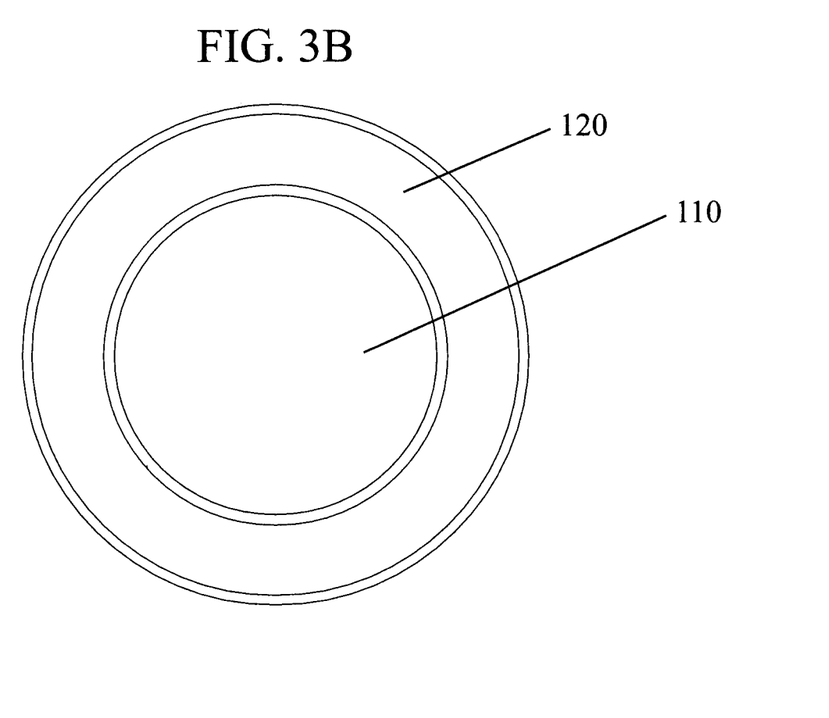
FIG. 3B is a bottom view of the Teflon saddle of FIG. 2A.

FIG. 3A is a top view of the Teflon saddle 100 of FIG. 2A. FIG. 3B is a bottom view of the Teflon saddle 100 of FIG. 2A.

Figure 4A:
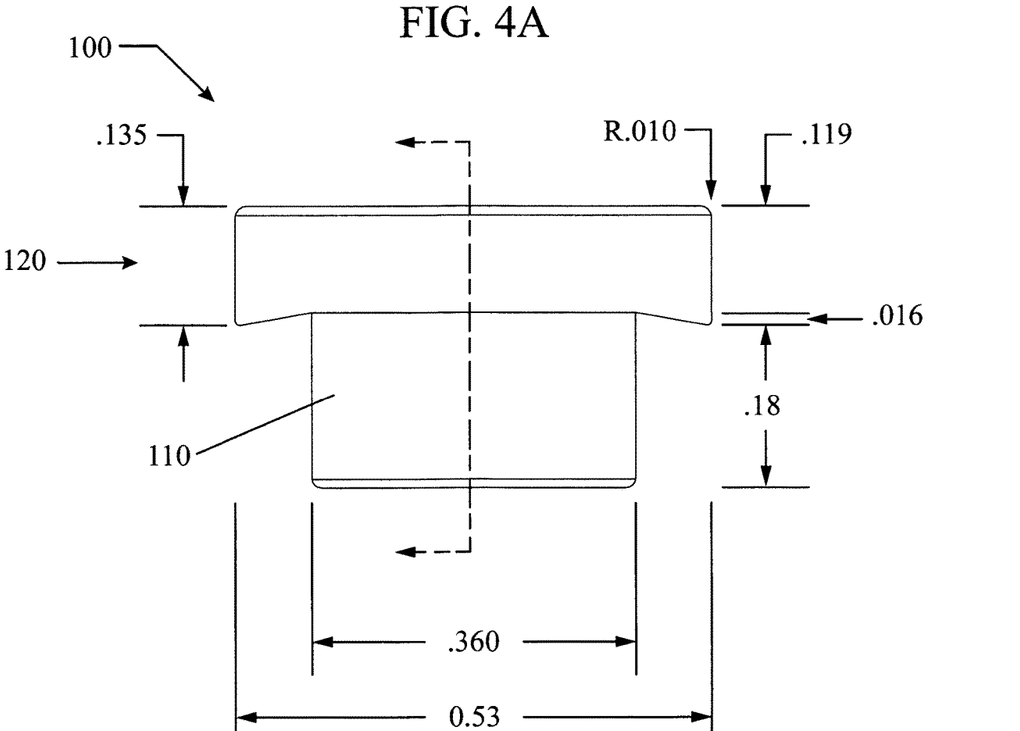
FIG. 4A is a side view of the Teflon saddle of FIG. 2A.
Figure 4B:
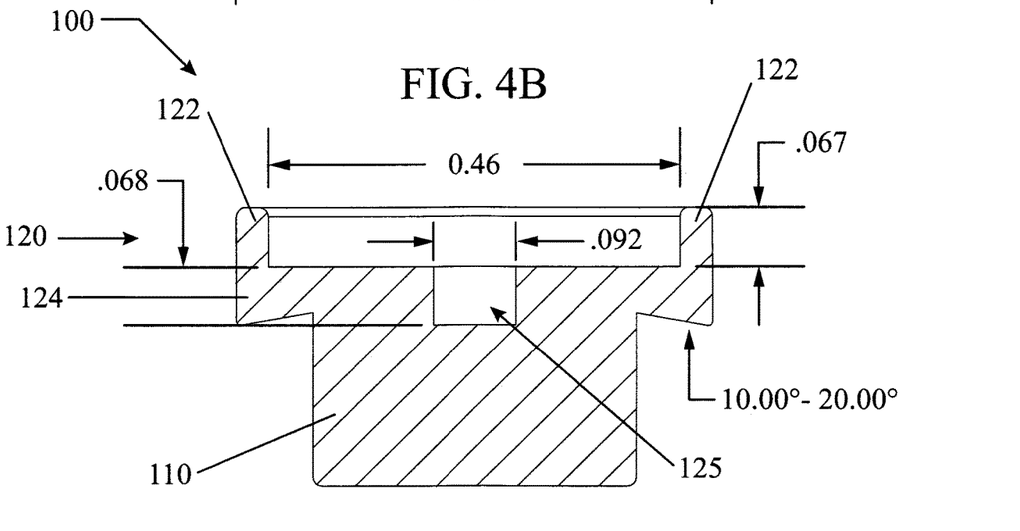
FIG. 4B is a cross-sectional view of the Teflon saddle of FIG. 4A along arrows 4B.

FIG. 4A is a side view of the Teflon saddle 100 of FIG. 2A. FIG. 4B is a cross-sectional view of the Teflon saddle 100 of FIG. 4A along arrows 4B.

Referring to FIGS. 2A-4B, the Teflon saddle 100 can be one-piece and can include solid cylindrical base 110, with an upper enlarged cylindrical section 120 having a raised rim 122, and a center opening 125 in the upper enlarged cylindrical section 120. The outer perimeter of the raised rim 122 can have a radius of approximately ⌀ 0.530 and an inner diameter of approximately ⌀ 0.458. The central opening 125 can have a radius of approximately ⌀ 0.92.

A prototype of the Teflon saddle 100 can have a lower solid cylindrical base 110 having a diameter or approximately 0.360 inches and a height of approximately 0.196 inches (0.18+0.016). The upper enlarged cylindrical section 120 can have a diameter of approximately 0.53 inches, with a height of approximately 0.135 inches.

On top of the upper enlarged cylindrical section 120 can be a raised rim 122, having a height of approximately 0.067 inches raised above a base 124. The circular rim 122 can be approximately 0.46 inches apart.

The bottom of the base 124 can have an outer height of approximately 0.068 inches that inclines upward at approximately 10 degrees to approximately 20 degrees up approximately 0.016 inches from the outer perimeter, and the rim 122 can have a height of approximately 0.067 inches. The space between the raised rim 122 can be approximately 0.46 inches. The center opening 125 in the upper enlarged cylindrical section 120 can have a depth of approximately 0.068 inches to a solid bottom, and a diameter of approximately 0.092 inches.

Saddle 100 shown in FIGS. 4A-4B can be used with an approximately ½ inch sprinkler head. For different size sprinkler heads, the saddle 100 can be sized larger or smaller accordingly.

The above dimensions include units for an existing ½ inch sprinkler head 1, and can be modified and updated for different sprinkler heads such as but not limited to ¾ inch, and 1 inch sprinkler heads and the like.

Saddle 100 can be molded, by injection molding and the like into a solid one piece of Teflon.

Figure 5A:
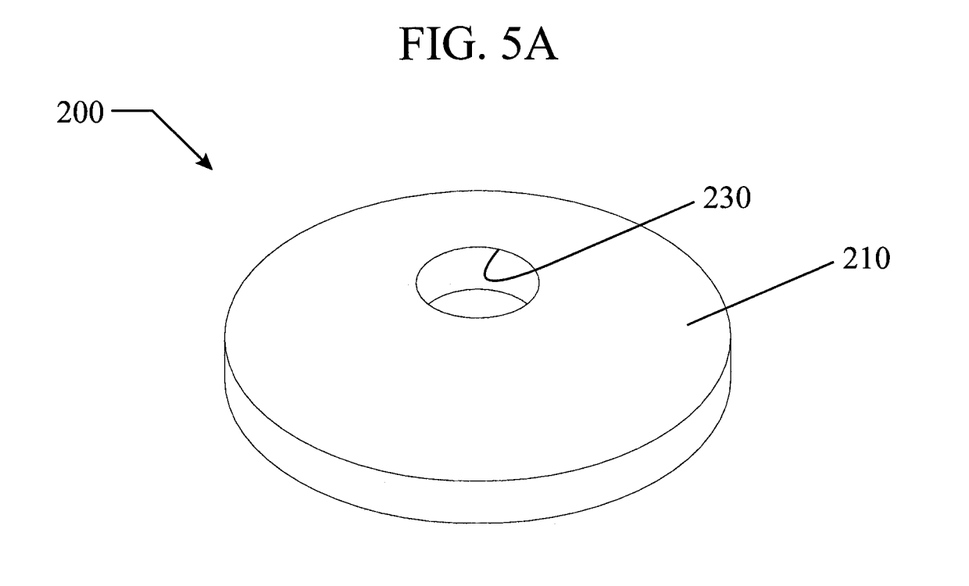
FIG. 5A is an upper side perspective view of the stainless steel washer for use with the Teflon saddle of FIGS. 2A-4B.
Figure 5B:
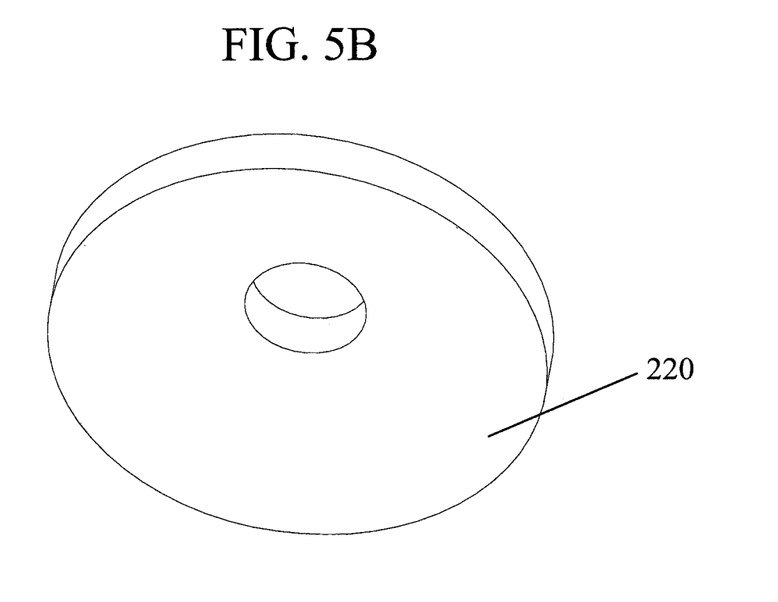
FIG. 5B is a lower side perspective view of the stainless steel washer of FIG. 5A.

FIG. 5A is an upper side perspective view of the beveled stainless steel washer 200 for use with the Teflon saddle 100 of FIGS. 2A-4B. FIG. 5B is a lower side perspective view of the stainless steel washer 200 of FIG. 5A.

Figure 5C:
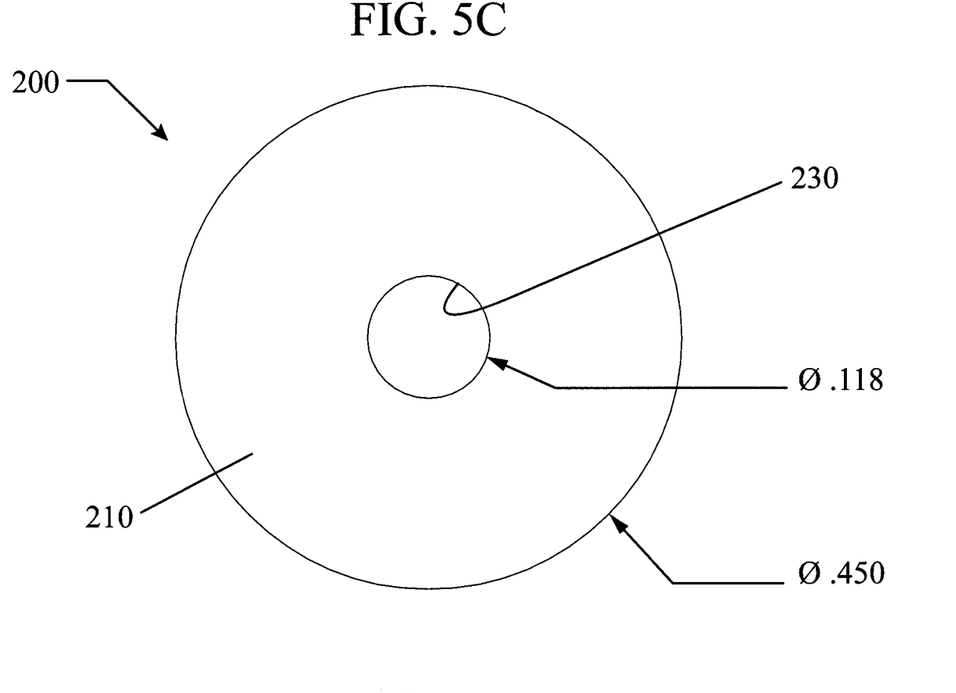
FIG. 5C is a top view of the stainless steel washer of FIG. 5A.
Figure 5D:
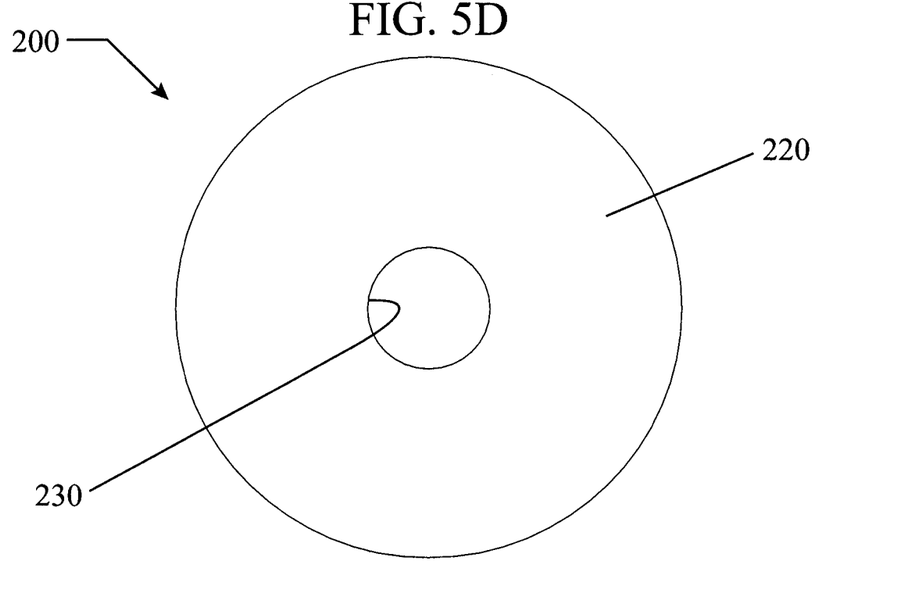
FIG. 5D is a bottom view of the stainless steel washer of FIG. 5A.

FIG. 5C is a top view of the beveled stainless steel washer 200 of FIG. 5A. FIG. 5D is a bottom view of the beveled stainless steel washer 200 of FIG. 5A.

Referring to FIGS. 5A-5D, the beveled stainless steel washer can have an outer curved edge of approximately ∅ 0.450, and the center hole 230 can have a circular opening of approximately ∅ 0.118.

Figure 6A:
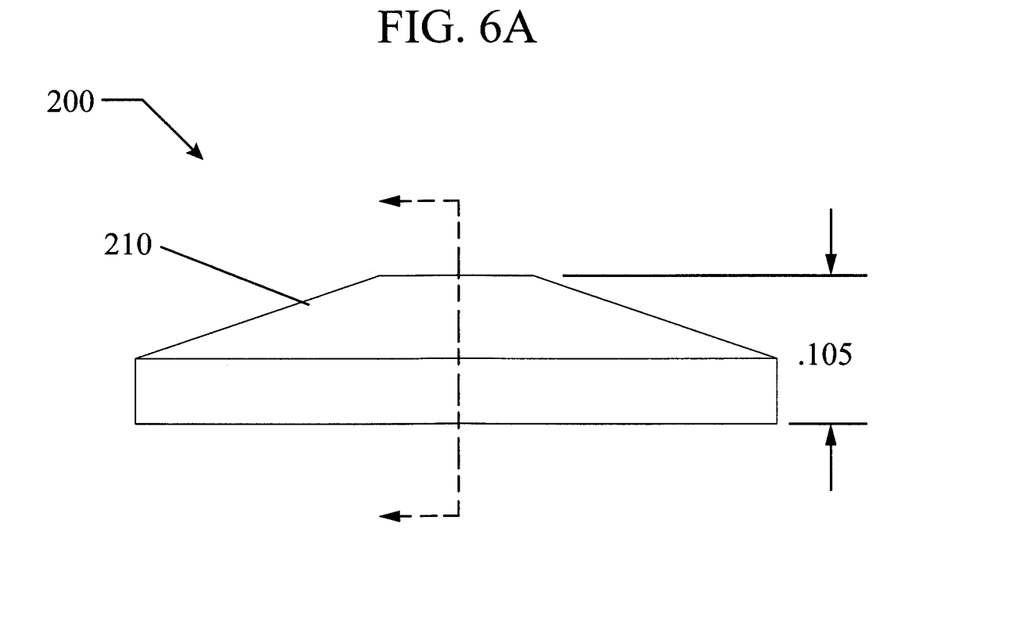
FIG. 6A is a side view of the stainless steel washer of FIG. 5A.
Figure 6B:
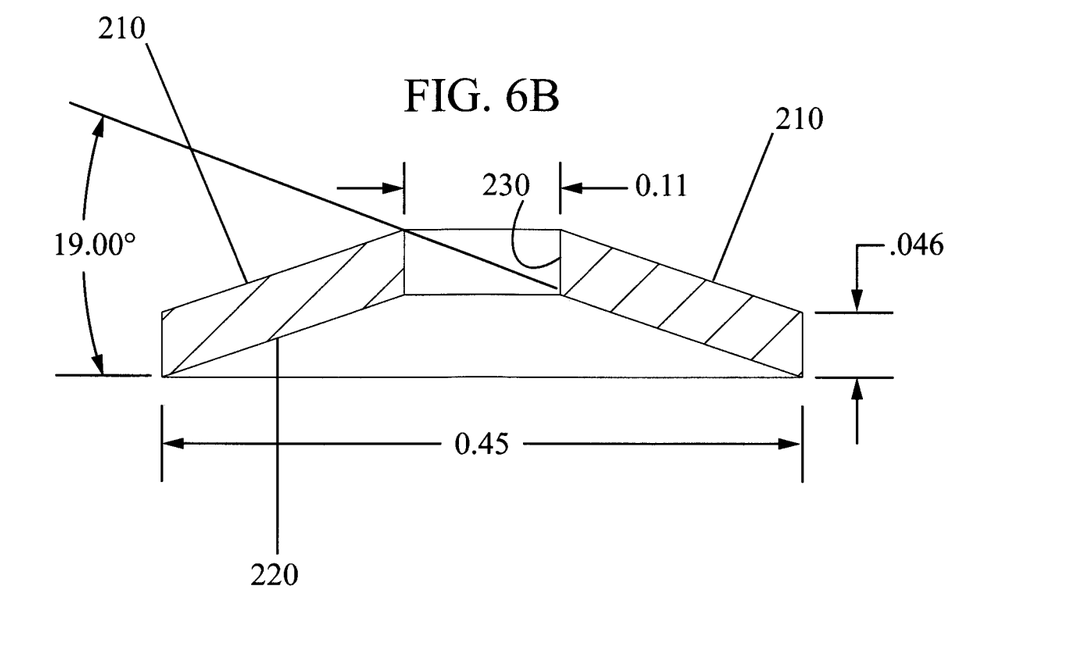
FIG. 6B is a cross-sectional view of the stainless steel washer of FIG. 6A along arrows 6B.

FIG. 6A is a side view of the beveled stainless steel washer 200 of FIG. 5A. FIG. 6B is a cross-sectional view of the beveled stainless steel washer 200 of FIG. 6A along arrows 6B.

Referring to FIGS. 5A-6B, the beveled stainless steel washer 200 can have an upper raised surface 210 from the outer perimeter edges to a center opening 125. The washer 200 can have a lower raised surface 220 running from the outer perimeter edges to the center opening 125.

The diameter of the beveled washer 200 can be approximately 0.45 inches, and the thickness of the washer 200 can be approximately 0.046 inches. The center opening 230 can have a diameter of approximately 0.11 inches. The lower raised surface 220 can have an angle of approximately 19 degrees from the outer perimeter to the central opening 230.

The beveled washer 200 can have sizes of approximately 3 mm or approximately 5 mm, in order to seat the glass bulb 8 used in a sprinkler head 1, shown in FIGS. 1A-1B.

Figure 7A:
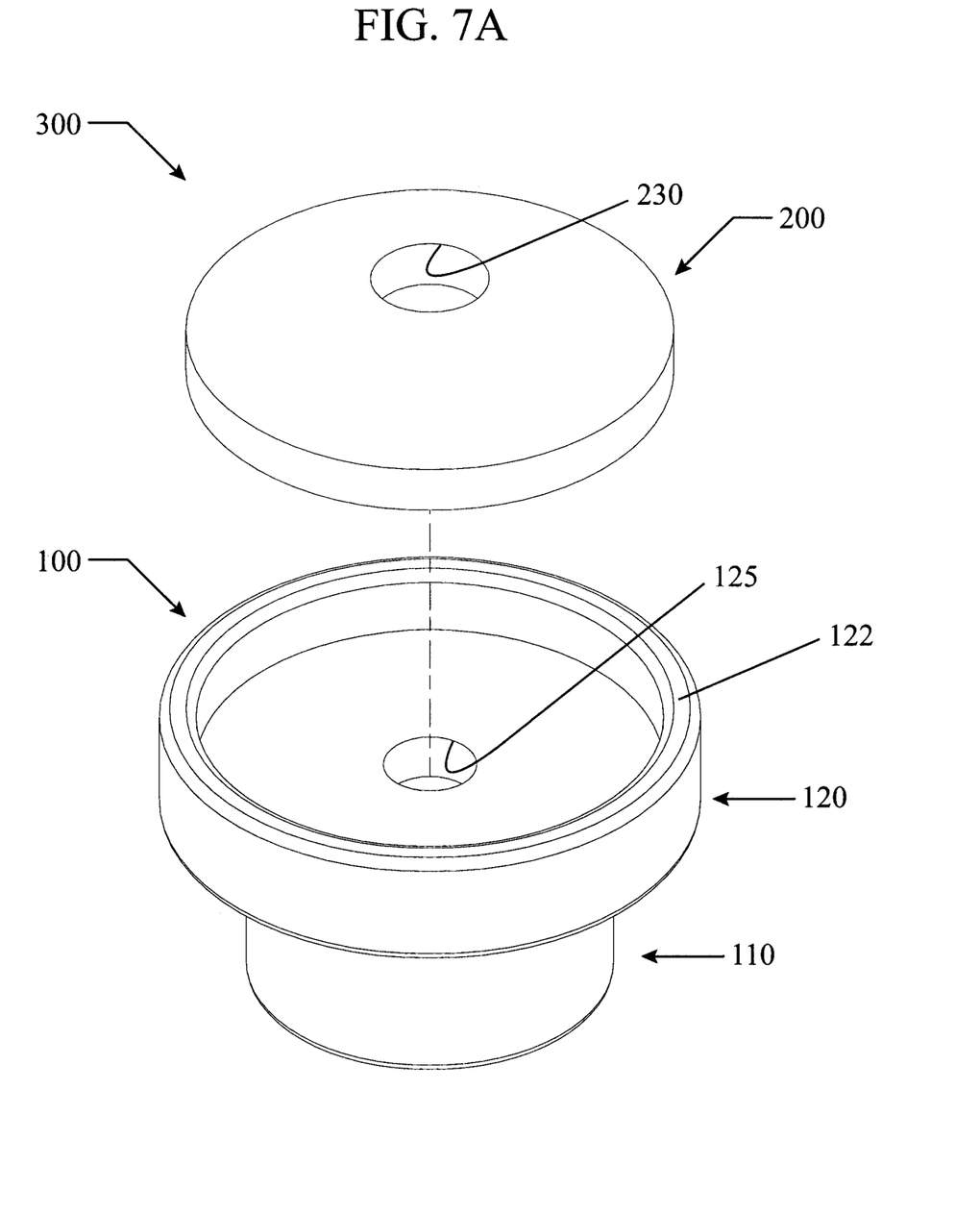
FIG. 7A is an exploded perspective view of the Teflon saddle of FIGS. 2A-4B with the stainless steel washer of FIGS. 5A-5B.

FIG. 7A is an exploded perspective view 300 of the Teflon saddle 100 of FIGS. 2A-4B with the stainless steel washer 200 of FIGS. 5A-5B.

Figure 7B:
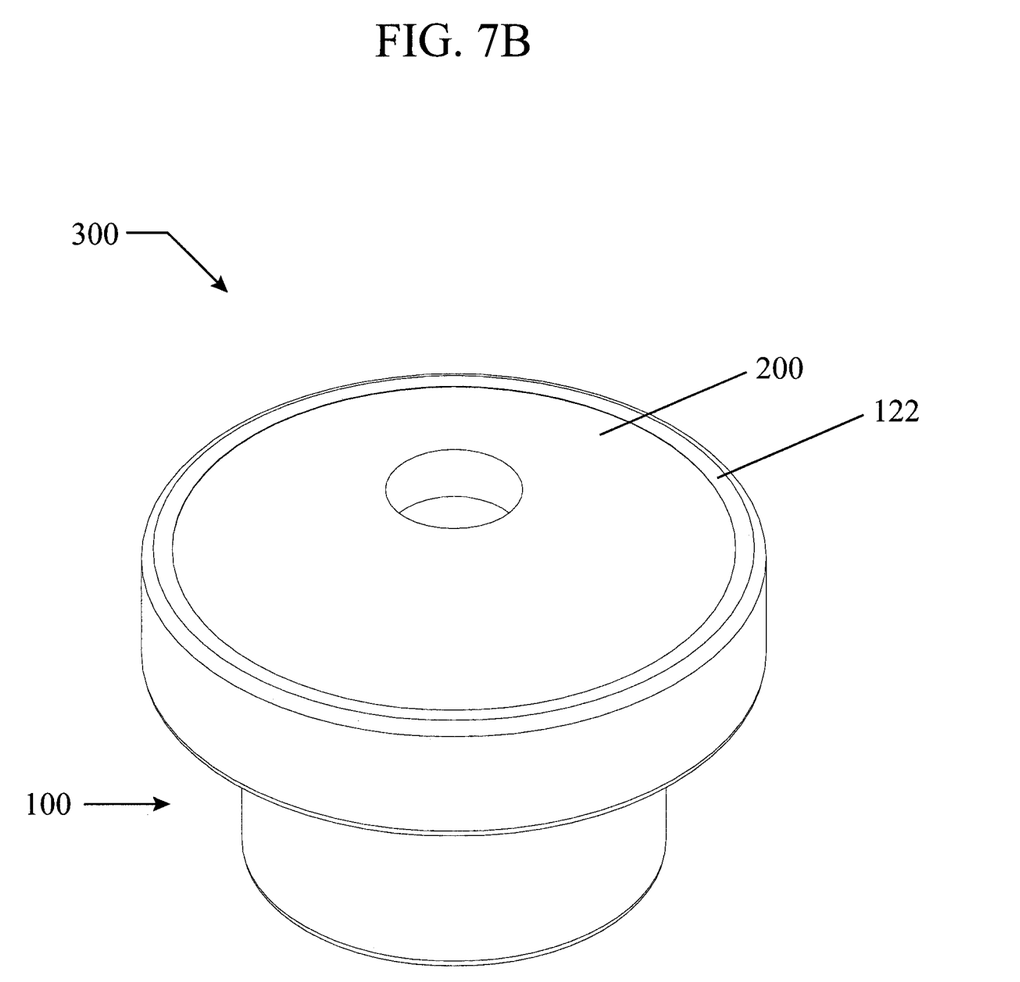
FIG. 7B is an upper side perspective view of the assembled Teflon saddle with stainless steel washer of FIG. 7A.

FIG. 7B is an upper side perspective assembled view 300 of the Teflon saddle 100 with stainless steel washer 200 of FIG. 7A. For assembly, the stainless steel washer 200 can be press fit (friction fit) within the raised rim 122 of the Teflon saddle 100 with the center hole 230 of the washer 200 generally aligned with the center opening 125 of the saddle 100.

Figure 8A:
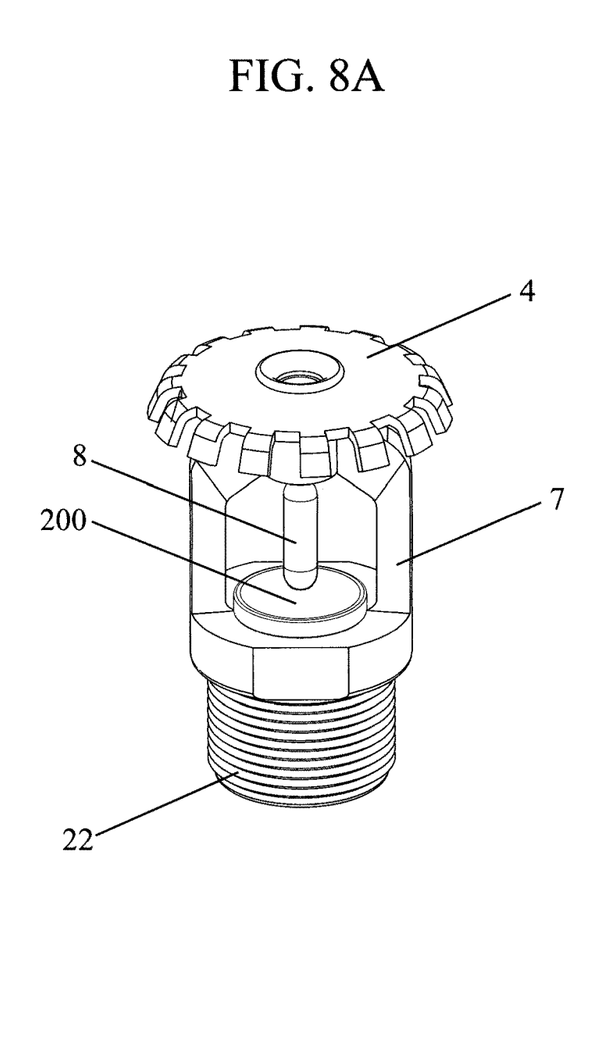
FIG. 8A is an assembled perspective view of the assembled Teflon saddle with stainless steel washer in a sprinkler head.

FIG. 8A is an assembled perspective view of the assembled Teflon saddle 100 with stainless steel washer 200 in a sprinkler head 4, 7, 8, 20, 22, shown as described previously in FIGS. 1A-1B.

Figure 8B:
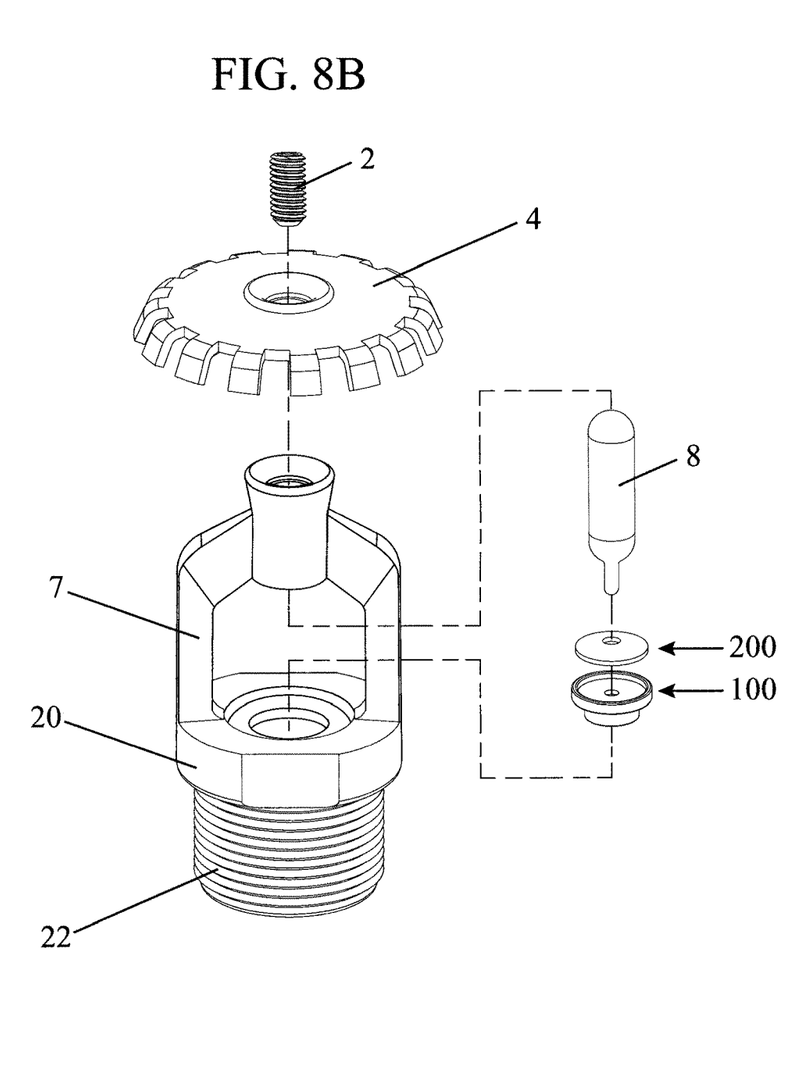
FIG. 8B is an exploded perspective view of the Teflon saddle, stainless steel washer and sprinkler head of FIG. 8A.

FIG. 8B is an exploded perspective view of the Teflon saddle, 100 stainless steel washer 200 and sprinkler head 4, 7, 8, 20, 22 of FIG. 8A.

Figure 9A:
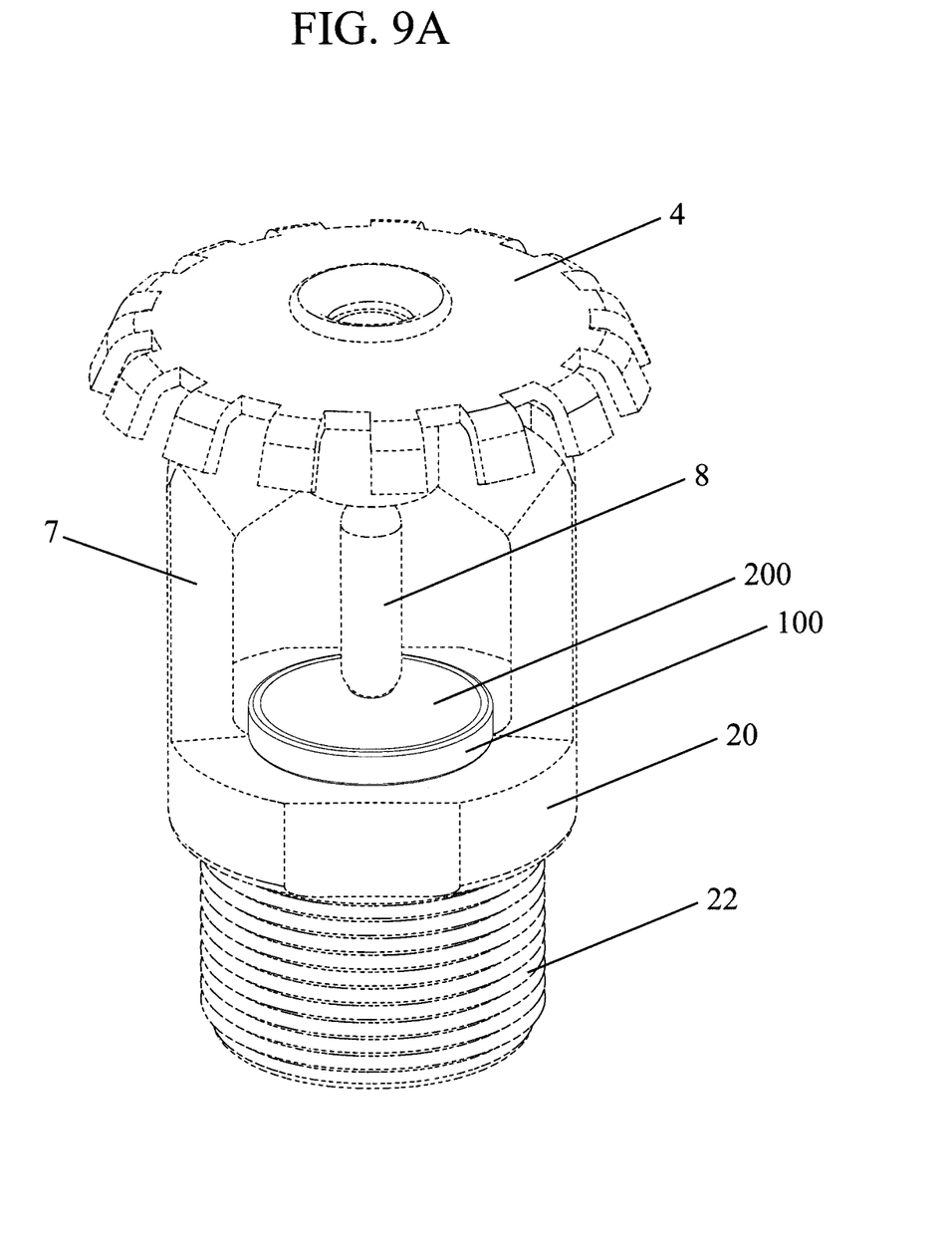
FIG. 9A is an enlarged assembled perspective partial ghost view of the assembled Teflon saddle with stainless steel washer in a sprinkler head of FIG. 8A, with deflector and assemble screw starting to be threaded into the threaded top opening of the frame of the sprinkler head.

FIG. 9A is an enlarged assembled perspective partial ghost view of the assembled Teflon saddle 100 with stainless steel washer 200 in a sprinkler head 4, 7, 8, 20, 22 of FIG. 8A, with deflector 4 and assemble screw 2 starting to be threaded into the threaded top opening of the frame 7 of the sprinkler head 1.

Figure 9B:
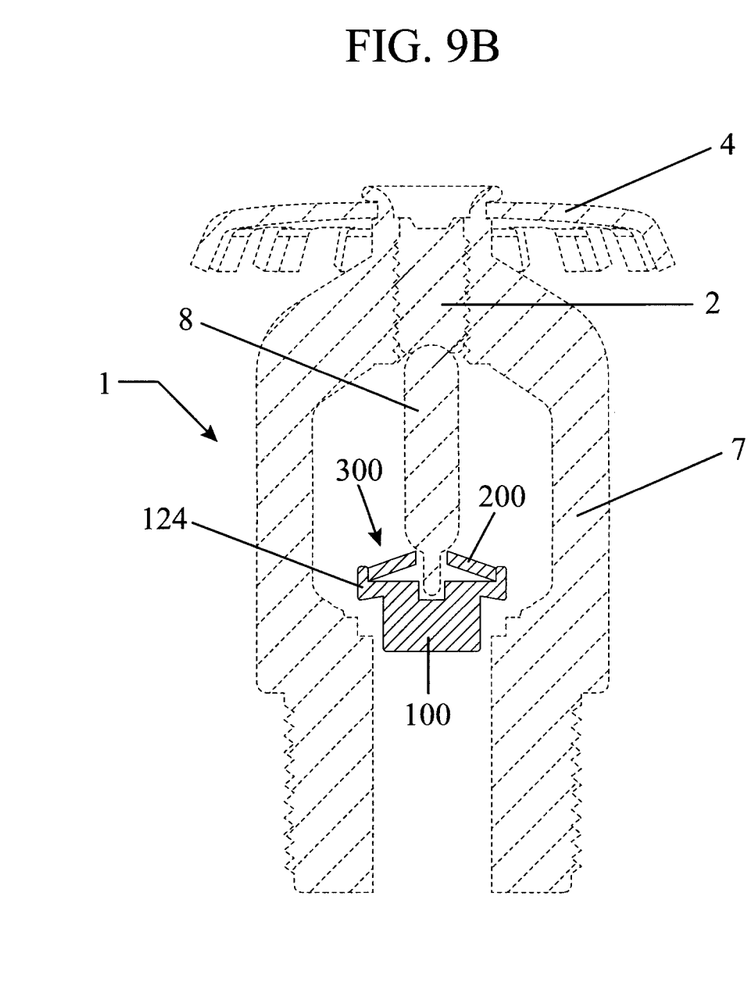
FIG. 9B is another assembled perspective partial ghost view of FIG. 9A.
Figure 9C:
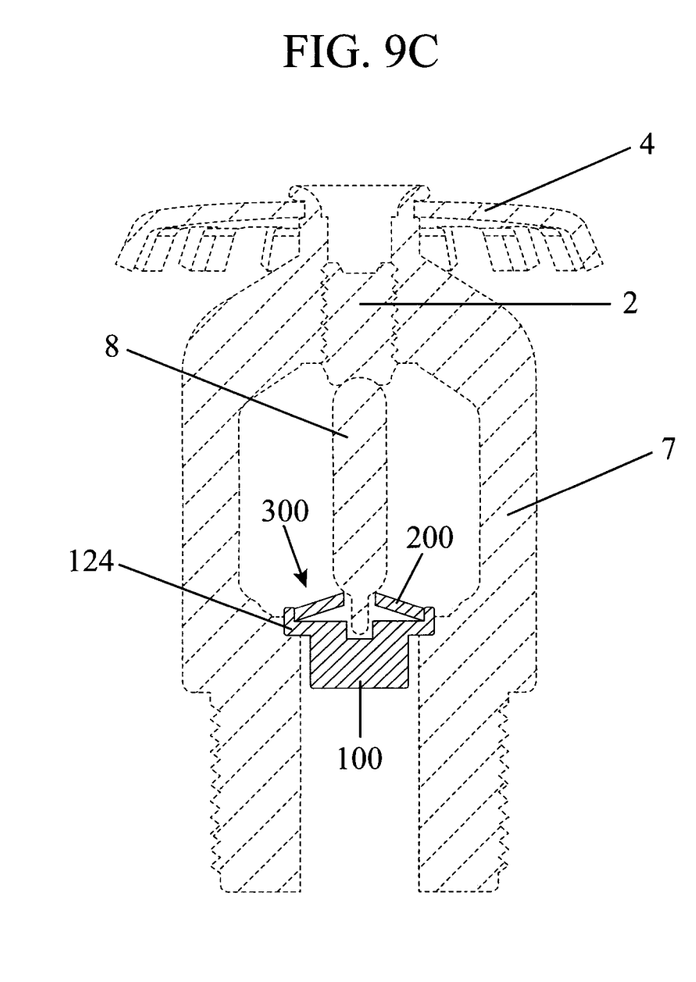
FIG. 9C is another partial ghost view of FIG. 9B with assemble screw pushing bulb into the opening of the stainless steel washer causing bottom inclined edge of the saddle to compress.

FIG. 9B is another assembled perspective partial ghost view of FIG. 9A. FIG. 9C is another partial ghost view of FIG. 9B with assemble screw 2 pushing bulb 8 into the opening 125 of the stainless steel washer 200 causing the incline bottom of the base 124 of the upper cylindrical section 120 of Teflon saddle 100 to be compressed and seated about a ledge/shoulder in the interior opening of the sprinkler head 1.

For the seating of the saddle 100 into the sprinkler head 1, the assembly/operator places frame 7 of the sprinkler head 1 into an assembly fixture. Then the assembly/operator places by hand the Teflon saddle 200 and glass bulb 8, sets the screw 2, and assembly is now complete. There must be a clearance between the saddle 100 and the interior housing opening in the sprinkler head 1.

The assembly is set to approximately 200 pounds of pressure for up to approximately 1 to approximately 5 minutes into a water vessel. No bubbles means the assembly unit passes. This procedure accurately describes the current/assembly manufacturing process in the industry today.

When water pressure is released by the sprinkler head 1, the saddle 100 should not become lodged in the interior housing of the sprinkler head 1.

With the Teflon saddle 100, there are no leakers in the sprinkler head.

The one piece saddle becomes spring loaded with the stainless steel washer 200, and is cost effective and lighter in weight than the prior art. The saddle 100 is accelerated out and exist quickly, when the sprinkler head is activated.

The majority of sprinkler heads used today are rated to action at approximately 155 to approximately 165 degrees F., indicated by a red bulb.

Teflon is rated to have an integrity between approximately −400 degrees F. to approximately 500 degrees F. Teflon is also referred to as polytetrafluoroethylene, PTFE In-house testing of the novel Teflon saddle 100 was done in at room temperature for fourteen (14) days under the following pressures:

Approximately 800 pounds(argon) pressure;

Approximately 10000 pounds of hydrogen pressure;

Approximately 300 pounds of water pressure; and

Approximately 800 to approximately 1000 pounds under air pressure.

No failures were recorded.

Industry standards generally require testing of sprinkler heads with water at approximately 200 pounds of pressure test for approximately 1 to approximately 5 minutes per unit (sprinkler head). If no bubbles are indicated the sprinkler head passes.

Thus, the novel Teflon saddle 100 surpasses the industry standards for sprinkler heads.

Table 1 lists desired and preferred operating temperatures for moldable material that can be used as the saddle 100.

TABLE 1

| OPERATING TEMPERATURES FOR SADDLE 100 | |
|---|---|
| Solid, Flexible and Malleable Form | At Room Temperature between Approximately 68 to approximately 76 degrees F., and up to approximately 110 degrees F. |
| Low Temperature | Works at up to approximately minus 400 F. |
| High Temperature | Works at up to approximately 500 F. |

Table 2 lists potential alternative materials that can be used instead of Teflon for the saddle 100.

TABLE 2

ALTERNATIVE MATERIALS FOR TEFLON

Polyethylene Terephthalate (PET or PETE)
High Density Polyethylene (HDPE)
Polyvinyl Chloride (PVC or Vinyl)
Low Density Polyethylene (LDPE)

Other types of materials for the molded saddle 100, can include but are not limited to polycarbonates, acrylics, nylon, thermos plastic, polypropylene, elastomers, polythelenes, resins, silicons, carbon fiber, and the like, composites and combinations that have similar operating temperatures to those in Table 1.

Table 3 lists potential alternative materials that can be used instead of stainless steel for washer 200.

TABLE 3

ALTERNATIVE MATERIALS FOR WASHER 200

Steel
Cast Iron
Aluminum Copper
Titanium
Tin Magnesium
Brass
Bronze
Zinc.

Other materials can be used for washer 200 having similar qualities can include brittle metals, refractory metals, white metal, heavy and light metals, Base, Noble and Precious metals, ferrous and Non-Ferrous metals, lead, solder, metal byproducts, and the like, combinations, that are similar to the results of using stainless steel.

The invention can further be practiced with a single component forming both the saddle 100 and washer 200, such as but not limited to a composite of any of the previous described materials and the like.

The term "approximately"/"approximate" can be +/−15% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A replacement saddle and washer assembly for a sprinkler head, comprising:
   a saddle having a cylindrical base, and
   an upper cylindrical section having a raised cylindrical rim, the upper cylindrical section having a wider diameter than the cylindrical base, the upper cylindrical section having an inclined bottom edge extending away from the cylindrical base, wherein the inclined bottom edge has in incline between approximately 1 to approximately 20 degrees from an outer perimeter to an inner end wherein the cylindrical base and upper cylindrical section are molded from one piece of a pliable and malleable material that remains as a solid between approximately minus 400 degrees F., and up to approximately 500 degrees F.; and
   a beveled metal washer that fits within the cylindrical rim.

2. The replacement saddle and washer assembly of claim 1, wherein the saddle is molded from one-piece of a material that remains malleable, pliable and flexible between temperatures ranges of approximately minus 400 degrees F. to approximately 5 degrees F.

3. The replacement saddle and washer assembly of claim 1, wherein the saddle is molded from one-piece of Teflon.

4. The replacement saddle and washer assembly of claim 1, wherein the beveled metal washer is a beveled stainless steel washer.

5. The replacement saddle and washer assembly of claim 1, wherein the upper cylindrical section includes:
   a narrow depth central opening through an upper surface centrally located within a middle portion of the raised cylindrical rim.

6. The replacement saddle and washer assembly of claim 1, wherein the upper cylindrical section has a diameter of approximately 0.53 inches, and the cylindrical base as a diameter of approximately 0.360 inches.

7. The replacement saddle and washer assembly of claim 6, wherein the raised cylindrical rim includes a height of approximately 0.67 inches above a flat central surface.

8. The replacement saddle and washer assembly of claim 7, wherein the base includes a height of approximately 0.196 inches, and the upper cylindrical section includes a height of approximately 0.119 inches, and wherein space between the raised cylindrical rim is approximately 0.46 inches.

9. A method for replacing beryllium washers with taped Teflon surfaces in sprinkler heads, comprising the steps of:
   providing a Teflon saddle with a cylindrical base and an upper cylindrical section having a raised cylindrical rim, the upper cylindrical section having a wider diameter than the cylindrical base, the upper cylindrical section having an inclined bottom edge extending away from the cylindrical base, wherein the inclined bottom edge has an incline between approximately 10 to approximately 20 degrees from an outer perimeter to an inner end, and, wherein the cylindrical base and upper cylindrical section are formed from one piece of Teflon; and providing a beveled stainless steel washer;

assembling the beveled stainless steel washer into the Teflon saddle; and replacing the beryllium washers with taped Teflon surfaces in sprinkler heads, with the one piece the Teflon saddle with the assembled beveled stainless steel washer.

10. The method of claim 9, further comprising the step of:

providing a narrow depth central opening through an upper surface centrally located within a middle portion of the raised cylindrical rim.

11. A Teflon saddle and washer assembly for sprinkler heads, comprising:

a cylindrical base; and an upper cylindrical section having a raised cylindrical rim, the upper cylindrical section having a wider diameter than the cylindrical base, the upper cylindrical section having an inclined bottom edge extending away from the cylindrical base, wherein the inclined bottom edge has an incline between approximately 10 to approximately 20 degrees from an outer perimeter to an inner end, and wherein the cylindrical base and upper cylindrical section are molded from one piece of Teflon; and a beveled stainless steel washer that is pressure fit within the cylindrical rim.

12. The saddle and washer assembly of claim 11, wherein the upper cylindrical section includes:

a narrow depth central opening through an upper surface centrally located within a middle portion of the raised cylindrical rim.

13. The saddle and washer assembly of claim 11, wherein the upper cylindrical section has a diameter of approximately 0.53 inches, and the cylindrical base as a diameter of approximately 0.360 inches.

14. The saddle and washer assembly of claim 12, wherein the inclined bottom edge has an incline between approximately 10 to approximately 20 degrees. From an outer perimeter to an inner end.

15. The saddle and washer assembly of claim 11, wherein the raised cylindrical rim includes a height of approximately 0.67 inches above a flat central surface.

16. The saddle and washer assembly of claim 11, wherein the base includes a height of approximately 0.196 inches, and the upper cylindrical section includes a height of approximately 0.119 inches.

17. The saddle and washer assembly of claim 11, wherein space between the raised cylindrical rim is approximately 0.46 inches.

18. A replacement saddle and washer assembly for a sprinkler head, consisting of:

a saddle having a cylindrical base, and an upper cylindrical section having a raised cylindrical rim, the upper cylindrical section having a wider diameter than the cylindrical base, the upper cylindrical section having an inclined bottom edge extending away from the cylindrical base, the inclined bottom edge having an incline which decreases from an outer perimeter to an inner end, wherein the cylindrical base and upper cylindrical section are molded from one piece of a pliable and malleable material that remains as a solid between approximately minus 400 degrees F., and up to approximately 500 degrees F.; and a beveled metal washer that fits within the cylindrical rim.

19. A method for replacing a Teflon taped beryllium washer in a sprinkler head, consisting of the steps of:

providing a saddle having a cylindrical base, and an upper cylindrical section having a raised cylindrical rim, the upper cylindrical section having a wider diameter than the cylindrical base, the upper cylindrical section having an inclined bottom edge extending away from the cylindrical base;

providing the cylindrical base and upper cylindrical section are molded from one piece of a pliable and malleable material that remains as a solid between approximately minus 400 degrees F., and up to approximately 500 degrees F.; and providing the inclined bottom edge has an incline which decreases from an outer perimeter to an inner end; and providing a beveled metal washer that fits within the cylindrical rim; and replacing the Teflon taped beryllium washer with the saddle and the beveled metal washer.

\* \* \* \* \*